Aug. 4, 1942.　　　　C. L. BEAL　　　　2,291,786
METHOD OF MAKING RUBBER ARTICLES
Filed Aug. 3, 1940　　　　2 Sheets—Sheet 1
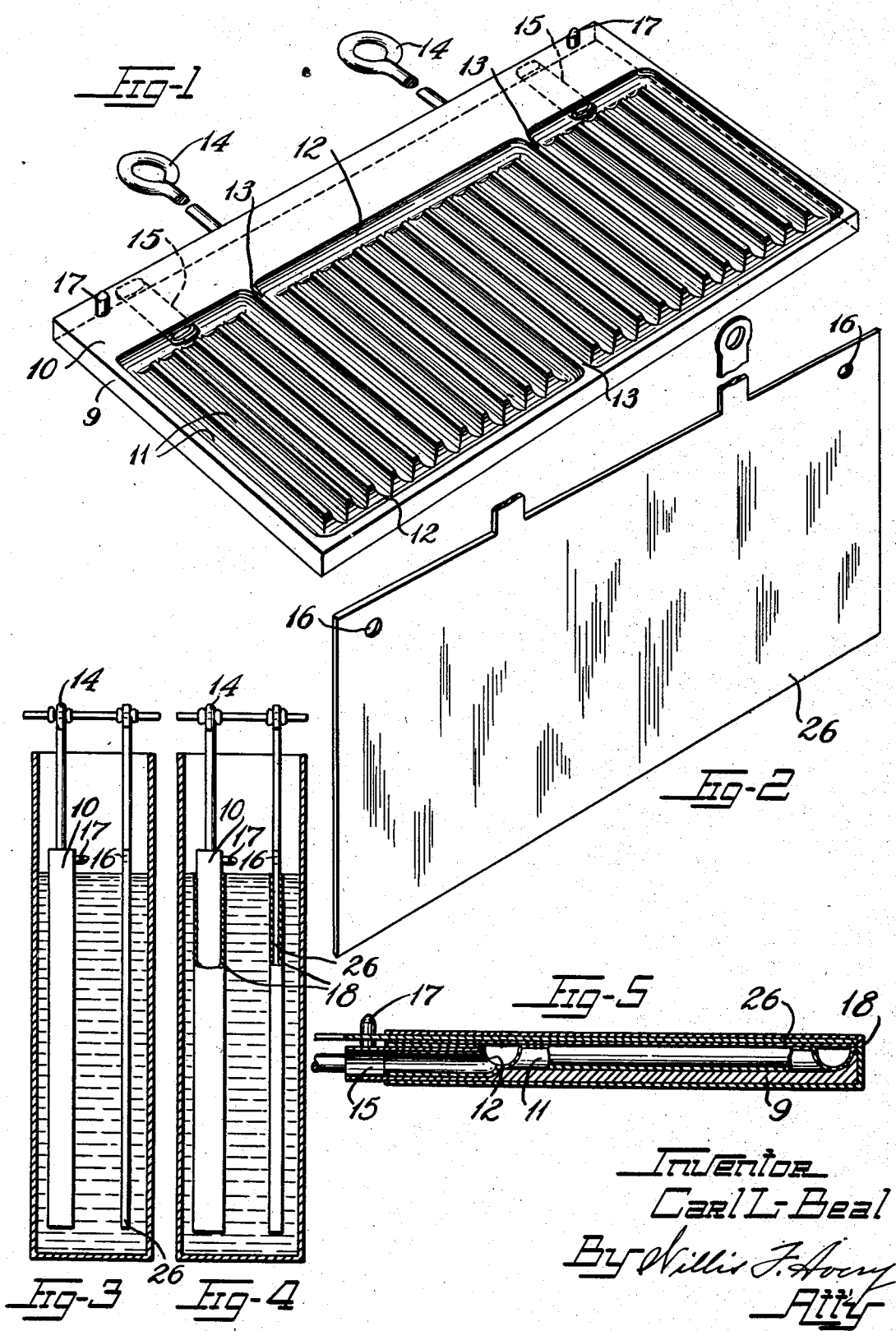
Inventor
Carl L. Beal
By Willis F. Avery
Atty Aug. 4, 1942.  C. L. BEAL  2,291,786
METHOD OF MAKING RUBBER ARTICLES
Filed Aug. 3, 1940   2 Sheets-Sheet 2
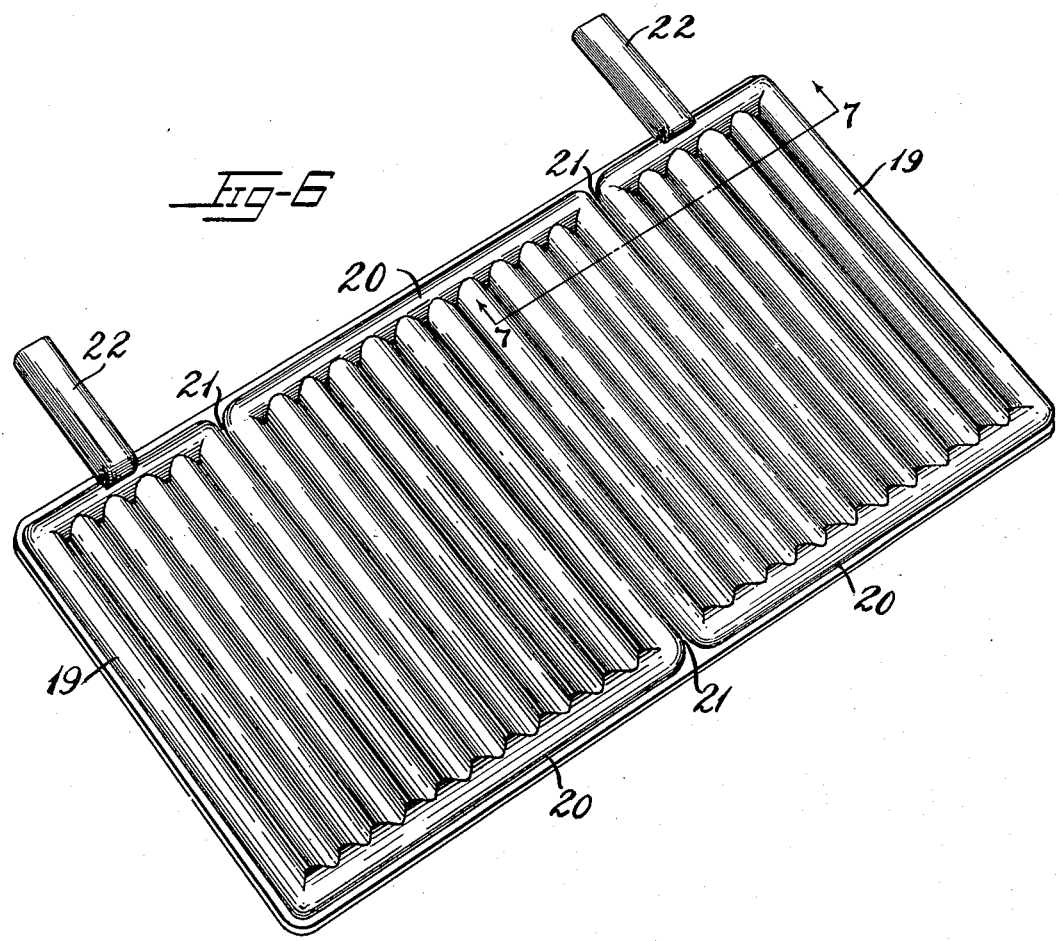
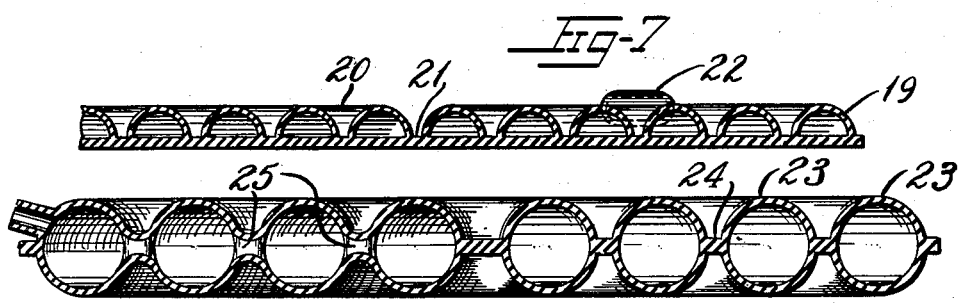
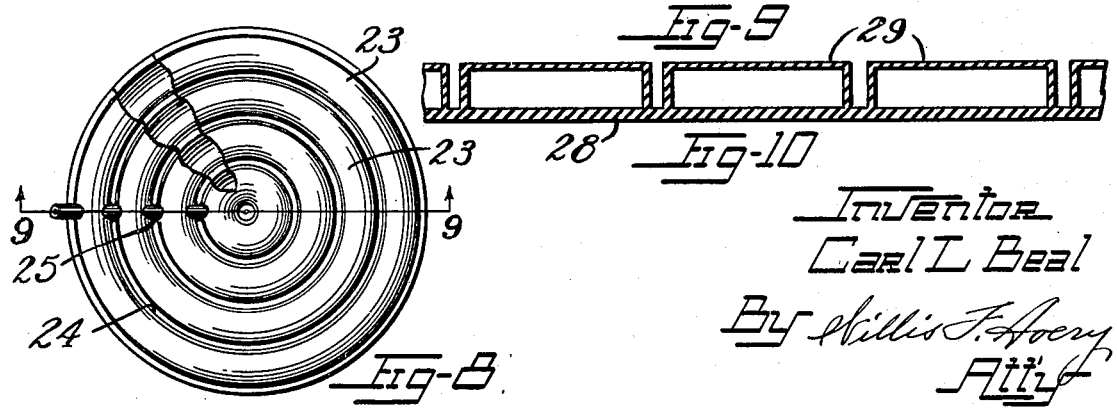
Inventor
Carl L. Beal Patented Aug. 4, 1942

2,291,786

UNITED STATES PATENT OFFICE 2,291,786

METHOD OF MAKING RUBBER ARTICLES

Carl L. Beal, Cuyahoga Falls, Ohio, assignor to American Anode Inc., Akron, Ohio, a corporation of Delaware Application August 3, 1940, Serial No. 350,689

3 Claims. (Cl. 18—58)

This invention relates to a method of making rubber articles from liquid dispersions of rubber such as latex, and particularly to a method of making hollow rubber articles of complicated structure.

The superiority, for many purposes, of rubber articles made from latex rubber is well recognized in the art but as the usual method of manufacturing rubber articles is to deposit rubber on a form, there has heretofore been many types of articles, such as hollow articles of complicated structure including internal partitions that could not be conveniently made on a deposition form in the usual manner. The object of this invention is to provide a convenient, efficient, and economical method of making hollow articles either with or without internal partitions.

Generally, the method of this invention comprises progressively coagulating rubber from an aqueous dispersion of rubber such as latex to produce a plurality of deposits constituting component parts of the desired article, joining the rubber deposits without any substantial interval of time while at least the surface of the rubber remains uncoagulated, and then permitting the coagulation to go to completion; whereby a unitary article is produced. Specifically the invention comprises providing at least two coacting deposition forms capable of being assembled as a unitary structure and whose confronting faces describe the outer surface of the article to be produced, progressively coagulating rubber from latex over the forms until a predetermined thickness of rubber has been deposited, withdrawing the forms from the latex and, without any substantial interval of time and while the surface of the deposit is still in an uncoagulated condition, assembling the forms with the margins and raised portions in contact. The coagulation is then permitted to go to completion. At the areas of contact it will be found that the progressive coagulation has caused a knitting together of the deposits so that the deposits are as one and there are no seams. The article is a unitary structure. The forms preferably are coated with rubber from an aqueous dispersion of rubber, such as latex, by the use of a coagulant such as any of those disclosed in U. S. Patent No. 1,996,090 granted to Edward A. Willson.

Although somewhat similar processes have been proposed heretofore for making rubber articles, these have not proven entirely satisfactory for making articles of complex design containing tortuous passageways. This is perhaps due to the fact that most prior methods formed seams in the article where the component parts were joined together. In an article of complex design this necessary multiplicity of seams make for bulkiness with the attendant danger that some portions of the seams may loosen when the article is in use.

By the method of my invention I progressively coagulate rubber from latex on coacting forms by immersing the forms first in a coagulant and then in latex. The rubber in the latex begins to deposit on the forms and the layer builds up. When the rubber layer has reached the desired thickness the forms are withdrawn from the latex. At this point the coagulated latex on the forms has an outer surface of uncoagulated latex. Before the uncoagulated latex on the outer surface has time to coagulate the forms are brought together in cohering relationship and the latex permitted to coagulate. This procedure calls for withdrawing the forms from the latex and then immediately assembling them in cohering relationship without any substantial time interval other than the necessary minimum involved in the actual mechanical operation. The uncoagulated latex on the surface of the deposits of rubber coagulates and knits the component parts together producing thereby the rubber article. The areas of joinder are all unitary and each component part is continuous with the other. There is no actual seam in the article but rather it is all of one piece construction.

The details of this invention can best be understood by reference to the accompanying drawings wherein a specific embodiment of the invention is detailed. Some typical articles are also shown in the drawings, of which Fig. 1 is a perspective view of a metal form with one surface hollowed out to define one side of the rubber article to be produced;

Fig. 2 is a perspective view of a metal form whose flat surface is adapted to coact with the surface of Fig. 1 to produce the article;

Fig. 3 is a cross-sectional elevation of the two coacting forms suspended in a bath of latex coagulant;

Fig. 4 is a cross-sectional elevation of the two coacting forms suspended in latex and coated with an overall layer of rubber coagulum;

Fig. 5 is a cross-sectional elevation of the two coacting forms assembled with the confronting surfaces in marginal contact;

Fig. 6 is a perspective view of the completed rubber article;

Fig. 7 is a cross-sectional elevation taken along line 7—7 of Fig. 6;

Fig. 8 is an elevation, partially broken away for clarity of illustration, of another rubber article made by the method of this invention;

Fig. 9 is a cross-sectional elevation taken along line 9—9 of Fig. 8;

Fig. 10 is a cross-sectional view of a portion of a rubber article made by the method of this invention.

A one-piece rubber article such as a thermal treatment applicator having numerous small communicating passageways may be made by the method of this invention. A principal deposition form 9 (Fig. 1) is provided with one surface 10 hollowed out in the shape of numerous small channels 11 substantially semi-circular in cross-section and arranged in parallel. These channels are in communicating relationship by means of similar channels 12 placed at the ends of and at right angles to the parallel channels 11. Barriers 13 are left in the form separating the parallel channels into groups. The principal form has two attached hanger rings 14, 14 for handling. An inlet and outlet section 15, 15 also provided in the form communicating, through the form, with the hollowed out section. There is also provided another deposition form 26 adapted to produce a flat surface of the rubber article and to coact with the principal form. This flat form has holes 16, 16 which engages pins 17, 17 on the principal form so the two can be held in place in contacting relationship. Both forms are dipped preferably first in latex coagulant (Fig. 3), and then in latex (Fig. 4) producing thereon an overall coating of rubber coagulum 18. Without any substantial time interval and while the surface of the rubber is uncoagulated the forms are brought together (Fig. 5) with the confronting surfaces coacting to form the rubber article to be produced. The two forms are kept in line by means of the pins 17 and holes 16 and only very slight pressure is needed while coagulation progresses and a unitary seam is produced. The coagulum is cut around the edge of the principal form, the forms are opened up and the rubber article is transferred to a bath of water to be washed. Because the rubber is freshly coagulated the washing operation is relatively easy. After washing the article is allowed to dry and set, and thereafter can be vulcanized; after which the excess rubber is trimmed off producing the completed article.

The finished rubber article comprises numerous small passages 19, semi-circular in cross-section, and arranged in parallel in communicating relationship by means of a manifold arrangement 20 at each side of the article. Barriers 21 are positioned in the article so that flow is maintained in parallel in a number of the tubes back and forth across the article for its full length. Inlet and outlet tubes 22, 22 are provided in the rubber article.

Illustrative of other types of articles that may be made by the method of this invention is a circular rubber cushion (Fig. 8) or the like made up of concentric circular passages 23, 23 separated by partitions 24 with each circular passage connected to the other by openings 25 in the partitions (Fig. 9); the openings lying in linear relationship. It is difficult to conceive of a method of making rubber articles similar to this from latex, except by the method of this invention, by any simple, efficient procedure. Another type of article made by the method of this invention is an inflatable mattress or the like of which Fig. 10 is a cross-section showing its structure. The article comprises a flat base 28 and cells 29 of rectangular cross-section placed thereon.

The term "latex" in this application is intended to include all naturally occurring or artificially prepared aqueuos dispersions of natural or synthetic elastics such as rubber, balata, caoutchouc, polyisobutylene, neoprene, and the like. It may be thickened, thinned, concentrated, or similarly prepared in any way desired and may be compounded with any of the usual compounding ingredients.

Although this invention has been described with references to the making of a particular rubber article and a particular type of article it is understood that I desire to protect the invention broadly limited only by the spirit and scope of the appended claims.

I claim:

1. In the manufacture of an article comprising rubbery material by a process in which a plurality of constituent parts of the article are pre-formed separately by deposition of rubbery material from an aqueous dispersion of such material and in which such pre-formed parts are thereafter permanently associated together, the method which comprises the steps of effecting deposition of the constituent parts by progressively coagulating the dispersion to produce separate deposits each substantially coagulated through a portion of its thickness but uncoagulated at a surface portion thereof, removing the said deposits from the aqueous disperson, bringing the said surface portions of the deposits into intimate cohering contacts while removed from the said dispersion and while the surfaces are still in an uncoagulated condition, and then permitting the coagulation to go to completion while maintaining such intimate cohering contact between the constituent parts, whereby a unitary rubbery structure is produced.

2. In the manufacture of an article comprising rubbery material by a process in which a plurality of constituent parts of the article are pre-formed separately by deposition of rubbery material upon complementary deposition forms immersed in an aqueous dispersion of such material and in which such pre-formed parts are thereafter permanently associated together, the method which comprises the steps of effecting deposition of the constituent parts by means of coagulant material preliminarily applied to the forms and which effects progressive coagulation of the dispersion on the forms to produce separate deposits each substantially coagulated through a portion of its thickness but uncoagulated at a surface portion thereof, removing the forms together with the deposits from the dispersion, bringing the said surface portions of the deposits into intimate cohering contact before the surfaces have become coagulated and while removed from the dispersion, and then permitting the coagulation to go to completion by continued action of the coagulant material on the forms while maintaining such intimate cohering contact between the constituent parts, whereby a unitary structure is produced.

3. In the manufacture of hollow articles formed of rubbery material and comprising internal passageways defined by internal partitions by a process in which constituent parts of the article are pre-formed separately by deposition of rubbery material from an aqueous dispersion of such material and in which such pre-formed parts are thereafter permanently associated together, the method which comprises the steps of providing a principal deposition form having a surface hollowed out in conformance with the desired passageways, providing a second deposition form adapted to be associated in complementary fashion with the principal form and comprising a generally flat face, effecting deposition of rubbery material on both said forms by progressively coagulating the dispersion to produce separate deposits each substantially coagulated through a portion of its thickness but uncoagulated at exposed surface portions thereof, removing the forms together with their deposits from the dispersion, assembling the forms and their deposits in complementary fashion with the deposit overlying the said flat face of the second form associated with the deposit overlying the hollowed out zone of the principal form by bringing the said surface portions into intimate cohering contact, the assembly being effected before the contacting surfaces of the deposits have become coagulated and while removed from the dispersion, and then permitting the progressive coagulation to continue to completion while maintaining such intimate cohering contact between the constituent deposits, whereby a unitary rubbery structure is produced.

CARL L. BEAL.